United States Patent
Kim et al.

(10) Patent No.: US 10,161,494 B2
(45) Date of Patent: Dec. 25, 2018

(54) MANUFACTURING METHOD OF SLIDING CAM ASSEMBLY AND ASSEMBLING METHOD OF CAM SHAFT ASSEMBLY INCLUDING SLIDING CAM AND FIXED CAM

(71) Applicant: Seojincam Co., Ltd., Pyeongtaek-si (KR)

(72) Inventors: Yong Kyoon Kim, Suwon-si (KR); Yung Sang Park, Pyeongtaek-si (KR); Jun Ho Song, Pyeongtaek-si (KR); Keun Ho Kang, Osan-si (KR)

(73) Assignee: Seojincam Co., Ltd., Pyeongtaek-si, Gyeonggi-do (KR)

( * ) Notice: Subject to any disclaimer, the term of this patent is extended or adjusted under 35 U.S.C. 154(b) by 104 days.

(21) Appl. No.: 15/301,254

(22) PCT Filed: Apr. 1, 2015

(86) PCT No.: PCT/KR2015/003249
§ 371 (c)(1),
(2) Date: Sep. 30, 2016

(87) PCT Pub. No.: WO2015/152631
PCT Pub. Date: Oct. 8, 2015

(65) Prior Publication Data
US 2017/0023118 A1    Jan. 26, 2017

(30) Foreign Application Priority Data

Apr. 2, 2014   (KR) ........................ 10-2014-0039225

(51) Int. Cl.
*F01L 1/00*   (2006.01)
*F16H 53/02*  (2006.01)
(Continued)

(52) U.S. Cl.
CPC ............ *F16H 53/025* (2013.01); *F01L 1/053* (2013.01); *F01L 1/047* (2013.01);
(Continued)

(58) Field of Classification Search
CPC ......... F16H 53/025; F01L 1/053; F01L 1/047; F01L 2013/0052; F01L 2001/0471; F01L 2103/00; Y10T 29/5133
See application file for complete search history.

(56) References Cited

U.S. PATENT DOCUMENTS 5,272,930 A * 12/1993 Nakamura ........... B21D 53/845
                                                   29/888.1
5,454,277 A * 10/1995 Imase ................... F16H 27/045
                                                   74/464

(Continued)

FOREIGN PATENT DOCUMENTS

DE   10 2011 0017 11 A1   10/2012
DE   10 2011 0018 11 A1   10/2012
(Continued)

OTHER PUBLICATIONS

ISR/KR, International Search Report pertaining to International Application No. PCT/KR2015/003249, 3 pages, dated Apr. 2, 2014.

*Primary Examiner* — Richard Chang
(74) *Attorney, Agent, or Firm* — Sunstein Kann Murphy & Timbers LLP

(57) ABSTRACT

Disclosed is a method of manufacturing a sliding cam assembly. In particular, a requirement for wear resistance of a hollow tubular portion in which sliding takes place can be satisfied due to a cam piece being fixed to the hollow tubular portion by diffusion bonding while the sliding cam assembly repeatedly slides along a shaft, and each component can be separately machined and combined, thus minimizing an amount which is wasted at the time of machining, reducing (Continued)

the machining time, and rendering a separate heat treatment of a cam piece unnecessary.

3 Claims, 3 Drawing Sheets

(51) Int. Cl.
*F01L 1/053* (2006.01)
*F01L 1/047* (2006.01)
*F01L 13/00* (2006.01)

(52) U.S. Cl.
CPC ................ *F01L 2001/0471* (2013.01); *F01L 2013/0052* (2013.01); *F01L 2103/00* (2013.01)

(56) References Cited

U.S. PATENT DOCUMENTS

| | | | |
|---|---|---|---|
| 2010/0288217 A1 | 11/2010 | Stolk et al. | |
| 2011/0079191 A1* | 4/2011 | Lengfeld ................ | F01L 1/053 123/90.18 |
| 2013/0047944 A1 | 2/2013 | Schwarzenthal et al. | |

FOREIGN PATENT DOCUMENTS

| | | |
|---|---|---|
| JP | 62-134160 | 6/1987 |
| JP | 03-056606 | 3/1991 |
| JP | 08-093415 | 4/1996 |
| KR | 10-1998-0021988 | 6/1998 |
| KR | 10-0799604 | 1/2008 |
| KR | 100799604 | 1/2008 |
| KR | 10-0052204 | 5/2009 |
| KR | 10-1305813 | 9/2013 |
| WO | WO 82/01016 | 4/1982 |

* cited by examiner

[Fig. 1]
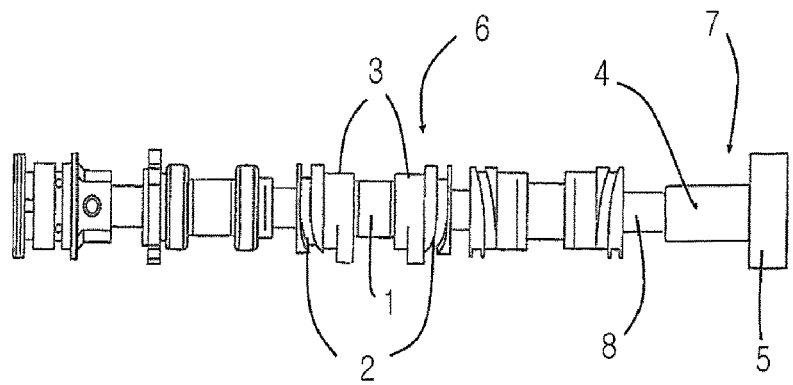
[Fig. 2]
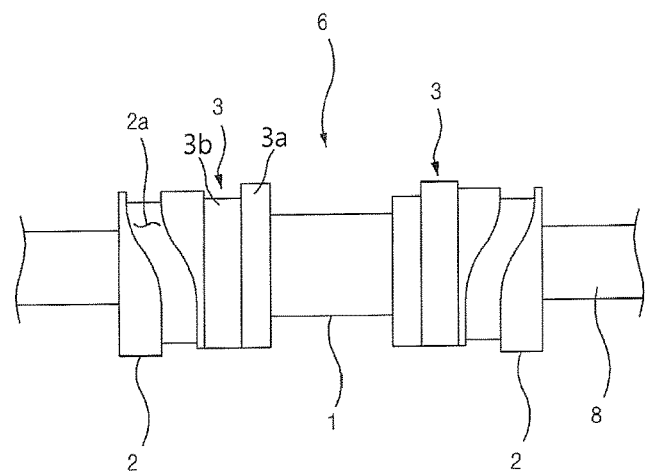
[Fig. 3]
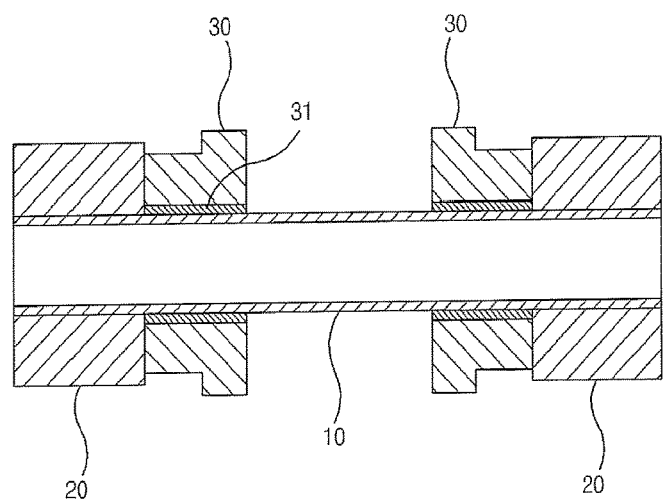

[Fig. 4]
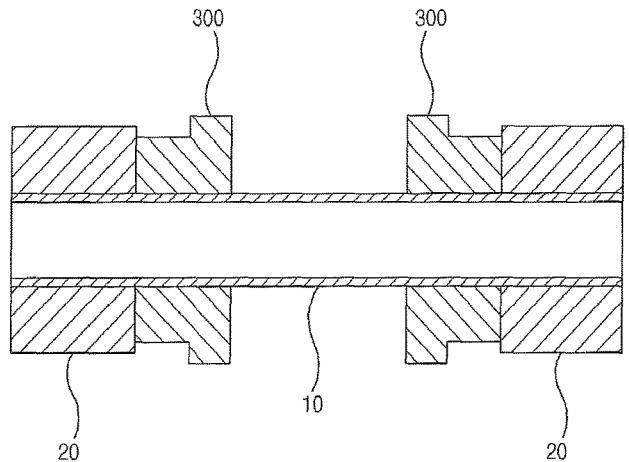
[Fig. 5]
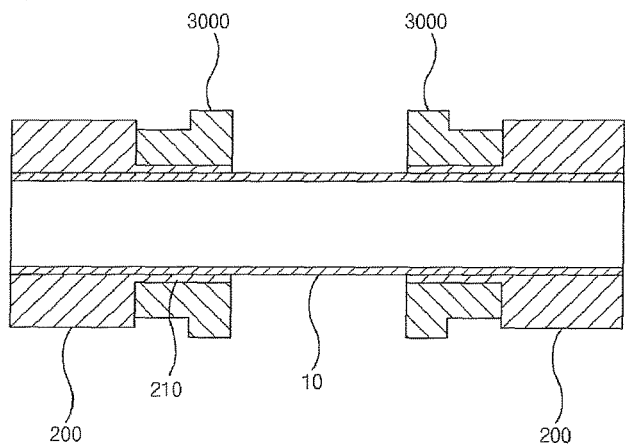
[Fig. 6]
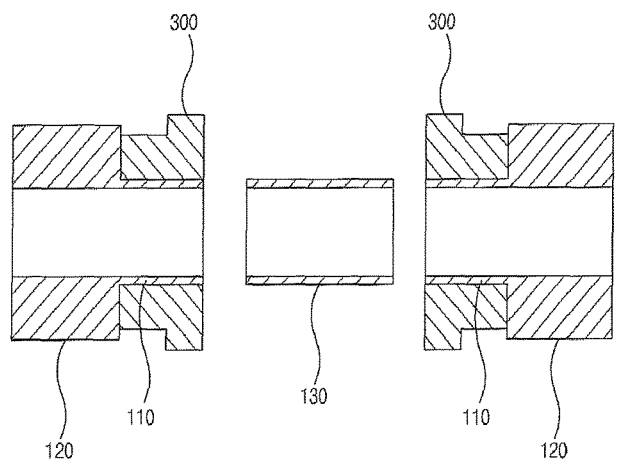

[Fig. 7]
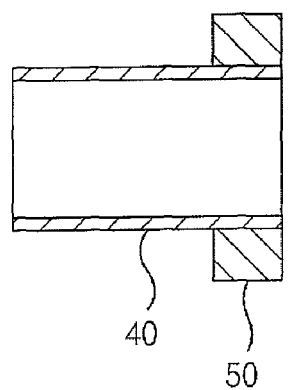
40
50

MANUFACTURING METHOD OF SLIDING CAM ASSEMBLY AND ASSEMBLING METHOD OF CAM SHAFT ASSEMBLY INCLUDING SLIDING CAM AND FIXED CAM

PRIORITY

This patent application is a § 371 application of PCT Application No. PCT/KR2015/003249 filed Apr. 1, 2015, entitled "Manufacturing Method of Sliding CAM Assembly and Assembling Method of CAM Shaft Assembly Including Sliding CAM and Fixed CAM," and naming Yong Kyoon Kim; Yung Sang Park; Jun Ho Song; Keun Ho Kang; and Cheon Hyo Park as inventors, which claims priority from Korean patent application No. 10-2014-0039225, filed in the Republic of Korea on Apr. 2, 2014, the disclosures of which are incorporated herein, in their entirety, by reference.

TECHNICAL FIELD

The present invention relates to a method of manufacturing a sliding cam assembly, and more particularly, to a method of manufacturing a sliding cam assembly in which a cam piece is fixed to a hollow tubular portion by diffusion bonding.

BACKGROUND ART

A method of manufacturing a cam shaft assembly according to the prior art is as follows.

In Japanese Laid-Open Patent No. 1987-134160, an example in which a cam shaft assembly having a solid shaft is manufactured by casting is disclosed.

In Japanese Unexamined Patent Publication No. 1991-56606, an example in which a cam piece is assembled in a hollow shaft by sintering is disclosed.

In US Patent Publication Nos. 2013-0047944 and 2010-288217, a cam shaft assembly having a sliding cam is disclosed.

In the cam shaft assembly having such a sliding cam, a sliding cam having a plurality of cam tracks cannot be rotated on the cam shaft but can be axially slidably mounted, and the sliding cam has a lifting shape engaged with an operation unit (implemented as a pin) of an actuator so as to achieve axial sliding of the cam. Each valve stroke is set by the axial sliding of the cam.

In such a conventional sliding cam, a hollow tube slidably provided with respect to a shaft, a lift guide disposed in both sides, and a high cam and a low cam which are disposed in close proximity to the lift guides of both sides are integrally formed. Such a sliding cam and a fixed cam are manufactured by machining a raw material in the shape of a round rod to conform to the shape of the cam. Thus, the machining quantities are excessively increased, which causes an increase in material costs, tooling costs, and the like.

In order to solve such a problem, as disclosed in German Unexamined Patent Publication No. 102011001711, an example in which a cam piece and a guide piece are integrally formed, a hollow tubular portion is separately formed, and the integrally formed cam piece and guide piece and the separately formed hollow tubular portion are coupled with each other through forced coupling and shape coupling is shown.

Meanwhile, in a case of the sliding cam, tolerance setting between a cam shaft and the sliding cam is a significantly important factor. Thus, in European Patent Publication No. 60257, an example in which electron beam hardening (EBH) is performed on a material having been subjected to machining to improve the hardness of the surface of the cam so that the deformation is minimized is shown. However, there is a problem that the hardness of a portion of the low cam close to the high cam is not uniform with other portions due to a shadow effect of the high cam portion at the time of EBH heat treatment.

DISCLOSURE OF INVENTION

Technical Problem

The present invention is directed to a method of manufacturing a sliding cam assembly in which a requirement for wear resistance of a hollow tubular portion in which sliding takes place can be satisfied due to a cam piece being fixed to the hollow tubular portion by diffusion bonding while the sliding cam assembly repeatedly slides along a shaft, and each component can be separately machined and combined, thus minimizing an amount which is wasted at the time of machining, reducing the machining time, and rendering a separate heat treatment of a cam piece unnecessary.

Solution to Problem

According to an aspect of the present invention, there is provided a method of manufacturing a sliding cam assembly, including: separately forming and preparing a hollow tubular portion in which a hollow is formed in a manner that the hollow tubular portion is slidable with respect to a shaft, a guide piece fixed to the hollow tubular portion, and a cam piece positioned adjacent to the guide piece; and coupling the guide piece and the cam piece to the hollow tubular portion, wherein a plurality of cams having mutually different lifts are formed in the cam piece in a stepped fashion, a spiral guide groove is formed on an outer peripheral surface of the guide piece, and the cam piece is fixed to the hollow tubular portion by diffusion bonding in the coupling.

Here, an inner ring may be inserted into the cam piece before the coupling, and the cam piece may be diffusion bonded to the inner ring to be coupled to the hollow tubular portion through the inner ring.

Also, a fitting tubular portion on which the cam piece is fitted may be formed in the guide piece, and the cam piece may be diffusion bonded to the fitting tubular portion to be coupled to the hollow tubular portion through the guide piece.

Also, the method of manufacturing the sliding cam assembly may further include machining a guide groove on the outer peripheral surface of the guide piece.

Also, the guide piece may be fixed to the hollow tubular portion by brazing, forcible pressing-in, or hot-pressing-in.

According to another aspect of the present invention, there is provided a method of manufacturing a sliding cam assembly, including: separately forming and preparing a hollow tubular portion in which a hollow is formed in a manner that the hollow tubular portion is slidable with respect to a shaft and in which a guide piece is integrally formed on an outer peripheral surface of the hollow tubular portion, and a cam piece positioned adjacent to the guide piece; and coupling the cam piece to the hollow tubular portion, wherein a plurality of cams having mutually different lifts are formed in the cam piece in a stepped fashion, a spiral guide groove is formed on an outer peripheral surface of the guide piece, and the cam piece is fixed to the hollow tubular portion by diffusion bonding in the coupling.

According to still another aspect of the present invention, there is provided a method of assembling a cam shaft assembly including a sliding cam and a fixed cam, including: separately forming and preparing a hollow tubular portion in which a hollow is formed in a manner that the hollow tubular portion is slidable with respect to a shaft, a guide piece fixed to the hollow tubular portion, and a cam piece positioned adjacent to the guide piece; coupling the guide piece and the cam piece to the hollow tubular portion; and fixing the fixed cam to the shaft, wherein a plurality of cams having mutually different lifts are formed in the cam piece in a stepped fashion, a spiral guide groove is formed on an outer peripheral surface of the guide piece, and the cam piece is fixed to the hollow tubular portion by diffusion bonding in the coupling.

Advantageous Effects of Invention

As described above, the method of manufacturing the sliding cam assembly of the present invention provides the following effects.

A requirement for wear resistance of the hollow tubular portion in which sliding takes place can be satisfied due to the cam pieces being fixed to the hollow tubular portion by diffusion bonding while the sliding cam assembly repeatedly slides along the shaft, and each component can be separately machined and combined, thus minimizing an amount which is wasted at the time of machining, reducing the machining time, and rendering a separate heat treatment of the cam pieces unnecessary.

The hollow tubular portion should receive a torque from the shaft while being slidably moved with respect to the shaft through the spline formed on the inner peripheral surface, and the cam pieces are brought into contact with a valve, so that the cam pieces and the hollow tubular portion require mutually different physical properties. The sliding cam assembly according to the present invention may be made of a material having an optimal physical property required in each of the hollow tubular portion and the cam pieces, thereby maximizing the durability and minimizing the manufacturing costs.

BRIEF DESCRIPTION OF DRAWINGS

The above and other objects, features and advantages of the present invention will become more apparent to those of ordinary skill in the art by describing in detail exemplary embodiments thereof with reference to the accompanying drawings, in which:

FIG. 1 is a perspective view showing a cam shaft assembly including a sliding cam and a fixed cam according to a preferred embodiment of the present invention;

FIG. 2 is an exploded view showing the sliding cam of FIG. 1;

FIG. 3 is a cross-sectional view showing a sliding cam in a method of manufacturing the sliding cam according to a first embodiment of the present invention;

FIG. 4 is a cross-sectional view showing a sliding cam in a method of manufacturing the sliding cam according to a second embodiment of the present invention;

FIG. 5 is a cross-sectional view showing a sliding cam in a method of manufacturing the sliding cam according to a third embodiment of the present invention;

FIG. 6 is a cross-sectional view showing a sliding cam in a method of manufacturing the sliding cam according to a fourth embodiment of the present invention; and FIG. 7 is a cross-sectional view showing a fixed cam in a method of manufacturing the fixed cam according to a preferred embodiment of the present invention.

MODE FOR THE INVENTION

Hereinafter, preferred embodiments of the present invention will be described in detail with the accompanying drawings. For reference, the above-mentioned related art will be referred to regarding the components of the present invention to be described below that are the same as those of the related art, and separate detailed description thereof will be omitted.

First Embodiment

As shown in FIGS. 1 to 3, a method of manufacturing a sliding cam assembly according to the present embodiment includes separately forming and preparing a hollow tubular portion 10 in which a hollow is formed in a manner that the hollow tubular portion 10 is slidable with respect to a shaft 8, guide pieces 20 fixed to the hollow tubular portion 10, and cam pieces 30 positioned adjacent to the guide pieces 20, and coupling the guide pieces 20 and the cam pieces 30 to the hollow tubular portion 10. Here, the cam pieces 30 are constituted of high cams 3a and low cams 3b, the guide pieces 20 are fixed to the shaft 10 by brazing in the coupling, and the cam pieces 30 are fixed by diffusion bonding.

The hollow tubular portion 10 is formed by machining an inner shape and an outer diameter of a hollow tubular material formed of the material S45C. An inner diameter of the hollow tubular portion 10 is larger than an outer diameter of the shaft 8. In addition, a length of the hollow tubular portion 10 is formed to be shorter than a length of the shaft 8.

The guide pieces 20 are formed by carrying out inner diameter turning of a round rod-shaped material close to the shape of the guide pieces 20 made of the material S45C. The guide pieces 20 are formed in ring shapes (donut shapes) so that outer peripheral surfaces of the guide pieces 20 are flat.

The cam pieces 30 are made of the material PFC2 (8% Cr).

The cam pieces 30 are preliminarily formed of a sintered material before being inserted into a sintering furnace for the purpose of coupling as will be described below.

Through-holes are formed at the centers of the cam pieces 30, and high cam portions and low cam portions are formed on outer peripheral surfaces of the cam pieces 30 in a stepped fashion.

Inner rings 31 are inserted into the through-holes of the cam pieces 30. That is, the inner rings 31 are fitted onto the cam pieces 30.

The inner rings 31 are made of the same material as the guide pieces 20, that is, S45C.

Next, the cam pieces 30 with the inner rings 31 fitted thereinto are inserted into the sintering furnace, so that the cam pieces 30 are bonded to the inner rings 31 through diffusion bonding. Thus, the cam pieces 30 are coupled to the hollow tubular portion 10 through the inner rings 31.

Next, inner diameter machining of the inner rings 31 is carried out, and side surface turning machining of the inner rings 31 and both ends of the cam pieces 30 is carried out.

A nickel (Ni) paste is applied to inner peripheral surfaces of the inner rings 31 and inner peripheral surfaces of the guide pieces 20.

The cam pieces 30, the inner rings 31, and the guide pieces 20 are fitted on both sides of the hollow tubular portion 10. On both sides of the hollow tubular portion 10, the guide pieces 20 are disposed on the outer side, and the cam pieces 30 are disposed further inward than the guide pieces 20.

Next, the two inner rings 31 and the guide pieces 20 are coupled to the hollow tubular portion 10 by brazing to fix a position and angle of each of the cam pieces 30 and the guide pieces 20.

Unlike the above description, the cam pieces 30 and the guide pieces 20 may be coupled to the hollow tubular portion 10 through forcible pressing-in or hot pressing-in.

When using a vacuum furnace at the time of brazing, BNi2 paste is applied.

An oil hole is machined in a center portion of the hollow tubular portion 10.

A spline (not shown) is formed inside the hollow tubular portion 10 by performing broaching on the inside of the hollow tubular portion 10, and is subjected to nitriding.

Cam lobes of the high cams 3a and the low cams 3b are formed to cross each other by additionally machining the high cam portions and the low cam portions of the cam pieces 30.

Unlike the above description, high cams and zero cams may be formed in the cam pieces. That is, a plurality of cams having mutually different lifts may be formed in the cam pieces.

In order to solve cam width deviation occurrence after sintering and prevent excessive loads at the time of grinding, milling is performed on side surfaces of the cam pieces 30.

A guide groove is machined in the guide pieces 20.

A journal is ground using a journal grinding wheel.

The cam pieces 30 are ground using a cam grinding wheel.

The grinding criteria of the cam pieces 30 are based on inner diameter broaching.

In this manner, each component of the sliding cam is separately machined to be coupled, and therefore an amount which is wasted at the time of machining may be minimized, the machining time may be reduced, and no separate heat treatment of the cam pieces 30 is required.

Through the above-described process, a sliding cam 6 is manufactured, which includes a hollow tubular portion 10 which is slidably provided with respect to the shaft 8 and in which a spline is formed on an inner peripheral surface to receive a torque from the shaft 8, guides 2 which are provided on an outer peripheral surface of the hollow tubular portion 10 and include spiral guide grooves 2a formed on an outer peripheral surface of the hollow tubular portion 10, and cams 3 which are provided on the outer peripheral surface of the hollow tubular portion 1 and disposed adjacent to the guides 2.

Second Embodiment

Detailed description and drawings of the same operations as in the above-described embodiment will be omitted.

In a method of manufacturing a sliding cam assembly according to another embodiment of the present invention, cam pieces 300 are fixed directly to the hollow tubular portion 10 through diffusion bonding without the inner rings 31 as shown in FIG. 4.

The cam pieces 300 and the guide pieces 20 to which a nickel paste is applied in a nozzle application method are fitted onto the hollow tubular portion 10.

The cam pieces 300 are coupled to the hollow tubular portion 10 through diffusion bonding, and the guide pieces 20 are coupled to the hollow tubular portion 10 by brazing.

Third Embodiment

Detailed description and drawings of the same operations as in the above-described embodiments will be omitted.

In a method of manufacturing a sliding cam assembly according to still another embodiment of the present invention, fitting tubular portions 210 on which cam pieces 3000 are fitted are formed on the guide pieces 200 as shown in FIG. 5, so that the cam pieces 3000 may be coupled to the hollow tubular portion 10 through the guide pieces 200.

The fitting tubular portions 210 are formed so as to protrude from both ends of the guide pieces 200.

A thickness of the fitting tubular portions 210 is formed thinner than a thickness of the guide pieces 200.

The cam pieces 3000 are fitted onto the fitting tubular portions 210 of the guide pieces 200.

The cam pieces 3000 are fixed to the guide pieces 200 through diffusion bonding.

Inner diameters of the guide pieces 200 are machined and turning of side surfaces thereof is carried out.

The guide pieces 200 to which the nickel paste is applied are fitted onto the hollow tubular portion 10 to carry out brazing. Thus, the guide pieces 200 and the cam pieces 3000 are fixed to the hollow tubular portion 10.

Fourth Embodiment

Detailed description and drawings of the same operations as in the above-described embodiments will be omitted.

As shown in FIG. 6, the method of manufacturing the sliding cam assembly according to the other embodiment of the present invention in order to achieve the above-described object includes separately forming and preparing a hollow tubular portion in which a hollow is formed in a manner that the hollow tubular portion is slidable with respect to the shaft 8 and in which guide pieces 120 are integrally formed on an outer peripheral surface of the hollow tubular portion, and the cam pieces 300 positioned adjacent to the guide pieces 120, and coupling the cam pieces 300 to the hollow tubular portion. Here, the cam pieces are constituted of high cams and low cams, and in the coupling, the cam pieces 300 are fixed by diffusion bonding.

The hollow tubular portion is formed separately as first tubular portions 110 and a second tubular portion 130.

The guide pieces 120 are integrally formed on outer peripheral surfaces of the first tubular portions 110.

The cam pieces 300 are fitted onto the first tubular portions 110 to be fixed by diffusion bonding.

The first tubular portions 110 and the second tubular portion are coupled.

In this manner, the hollow tubular portion is formed separately in several pieces, and then coupled, and therefore quality and cost problems may be solved at the time of inner side broaching machining.

Hereinafter, a method of assembling a cam shaft assembly including a sliding cam and a fixed cam will be described.

The sliding cam 6 manufactured in this manner is slidably fitted onto the shaft 8. In addition, a spline is formed on an outer peripheral surface of the shaft 8 to be meshed with a spline formed on an inner peripheral surface of a hollow tube 1. Thus, the sliding cam 6 receives a torque of the shaft 8 and is rotated together with the shaft 8 while being movable in an axial direction of the shaft 8 with respect to the shaft 8.

A fixed cam 7 is prepared, and the prepared fixed cam 7 is fixed to the shaft 8.

An operation of preparing the fixed cam is as follows.

As shown in FIG. 7, the fixed cam 7 is fixed with respect to the shaft 8, a second hollow tubular portion 40 in which a hollow is formed and a fixed cam piece 50 are separately formed, and the fixed cam piece 50 is fixed to the second hollow tubular portion 40 by diffusion bonding.

Since PFC2, which is a sintering powder material, may be applied to the fixed cam piece 50, the fixed cam piece 50 may be adopted as a cam lobe for high surface pressure.

In addition, the weight of both sides of the fixed cam piece 50 may be reduced.

Finishing machining may be separately performed on the fixed cam piece 50 and the second hollow tubular portion 40 coupled in this manner.

In this manner, the second hollow tubular portion 4 which is fixedly provided on the shaft 8 and receives a torque from the shaft 8 and the fixed cam 7 including a cam 5 provided on an outer peripheral surface of the second hollow tubular portion 4 are manufactured.

The inner rings may be inserted into the cam pieces before the coupling, or the fitting tubular portions on which the cam pieces are fitted may be formed in the guide pieces, so that the cam pieces are coupled to the hollow tubular portion through the guide pieces, and therefore coupling of the cam pieces may be more easily and effectively achieved.

After the coupling, the guide grooves on the outer peripheral surfaces of the guide pieces may also be machined, thereby further improving dimensional accuracy of the guide grooves.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

The invention claimed is:

1. A method of manufacturing a sliding cam assembly, comprising:
    separately forming and preparing a hollow tubular portion slidable with respect to a shaft, a guide piece, and a cam piece; and
    coupling the guide piece and the cam piece to the hollow tubular portion, so as to fix the guide piece and the cam piece to the hollow tubular portion with the cam piece positioned adjacent to the guide piece,
    wherein a plurality of cams having mutually different lifts are formed in the cam piece in a stepped fashion, a spiral guide groove is formed on an outer peripheral surface of the guide piece, and
    wherein an inner ring is inserted into the cam piece before the coupling, and the cam piece is diffusion bonded to the inner ring to be coupled to the hollow tubular portion through the inner ring.

2. The method of manufacturing the sliding cam assembly according to claim 1, further comprising, after the coupling:
    machining a guide groove on the outer peripheral surface of the guide piece.

3. The method of manufacturing the sliding cam assembly according to claim 1, wherein the guide piece is fixed to the hollow tubular portion by brazing, forcible pressing-in, or hot pressing-in.

* * * * *